Figure 1:
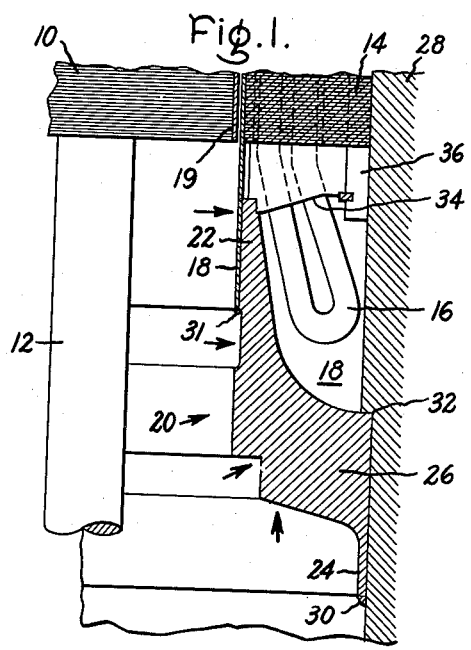

Aug. 20, 1963

A. W. BRUNOT 3,101,423

DYNAMOELECTRIC MACHINE

Filed Dec. 12, 1958

Inventor:
Albert W. Brunot
by James R. Campbell
His Attorney

United States Patent Office 3,101,423
Patented Aug. 20, 1963

3,101,423
DYNAMOELECTRIC MACHINE
Albert W. Brunot, Swampscott, Mass., assignor to General Electric Company, a corporation of New York
Filed Dec. 12, 1958, Ser. No. 779,978
1 Claim. (Cl. 310—86)

The invention described herein relates to dynamoelectric machines and more particularly to an improved arrangement for providing a high pressure seal for use in canned motors.

Canned motors of the type having cylinders on the stator and rotor cores are designed primarily to protect the stator windings from the environment in which the motor operates. This design of motor has found particular utility in installations where a high pressure pump, driven by the motor, circulates relatively high temperature liquid in a closed external loop. In order to properly cool the operating parts of the motor, a second and separate system circulates coolant through the gap or clearance provided between the cylindrical cans respectively mounted on the rotor and stator cores. Since it has been found desirable to have the liquid in the gap between the cans at the same pressure as that existing in the closed loop, pressure from the pump is reflected into the gap by appropriately spaced small openings near the shaft. This, however, presents problems of support for the stator can and other parts subject to deformation as a result of the extremely high pressures. This invention concerns itself with a high pressure seal used for preventing ingress of liquid into that area housing the windings by closing the lower end of the stator, while simultaneously supporting the bottom end of the can fixed in the bore of the stator.

Many different designs have been resorted to for supplying the necessary structural support to the stator parts, including the can disposed in the stator bore, while simultaneously performing a sealing function. In the usual construction, the stator punchings support the can throughout a major portion of its length and a pair of abutting cylindrical rings of sufficient strength to withstand pressures in the neighborhood of 3,000 p.s.i. serve as backing members for the remaining portions of the can, while also serving to seal the bottom end of the stator when it is in a vertical position. The bottom or lower ring is equipped with a cavity for housing the end turns positioned between inwardly directed fingers provided in parts associated with the stator. To obtain a tight seal, the bottom ring is welded at its inner peripheral ends to the can while the outer peripheral edge is likewise welded to the inner surface of the stator frame. The weld on the outer edge is usually about 1–1¼ inch thick to provide strength and effectively seal those areas at the bottom end of the can where leakage into the dead air space surrounding the coil end turns in the stator might otherwise occur.

A primary and important disadvantage of this type construction is that the cylindrical ring must be removed to make the coils accessible for repair. The likelihood of coil burnouts, for example, or other damage to the insulation requiring coil replacement, is not remote because of the high temperatures to which the machine is subjected. Removal of the cylindrical ring must therefore be made by machining out the weld. Since clearances between adjacent parts in this area are in the range of thousandths of an inch, some distortion occurs. The principal difficulty however, occurs during replacement of the ring because it must be secured to the stator frame with a heavy weld, thereby requiring the application of heat to parts which originally were provided with very small clearances. The heat, which is applied for extended periods of time, creates large stresses and distortion in the adjacent cylindrical structures which tend to weaken and otherwise deform the parts. These stresses in some canned motors may be so great as to require scrapping of the various parts in the area where the ring is welded in position. A further disadvantage is that the cost involved in replacing the parts with the accompanying liability of having to replace portions thereof because of misfits, make present practices prohibitive from a cost standpoint.

In still other constructions where heavy welds are not resorted to, the hydraulic pressures in and adjacent the air gap, cause the parts to buckle or otherwise deform thus causing leakage into that portion of the stator enclosing the coil conductors.

The object of my invention therefore, is to eliminate the disadvantages cited above by providing a ring of the desired strength and flexibility for sealing the bottom end of the stator while simultaneously providing a construction capable of facilitating removal and replacement of the ring with a minimum of time, effort, and expense.

In carrying out my invention, I close the bottom end of a vertically disposed stator with a ring of trapezoidal cross section. The upper outer surface of the ring is shaped to receive the coil end turns which are located in a dead air space when the ring is fitted in position between the stator can and frame. The central portion or body of the ring comprises a section of heavy material extending the complete distance between the stator can and the frame enclosing the stator to provide the structural support necessary for resisting forces created by the high pressure fluid circulated in the gap or space between the cans. The ring has an upwardly and axially directed tubular member adapted for close fit with the stator can and its uppermost end terminates in an end plate used for containing the stator laminations. The lower portion of the ring has another tubular member extending downwardly from the outermost part of the heavy section where the diameter is the same as the inside of the stator frame. In order to provide an effective seal, the inner and outer surfaces of the tubular members respectively, are welded to the can in the stator bore and to the frame enclosing the stator. The ring therefore is capable of withstanding the forces of liquid in the gap and rotor bearing cavity which tend to deform the ring and pull it away from the inner surface of the stator frame while simultaneously preventing leakage into the area enclosing the coil end turns.

Figure 2:
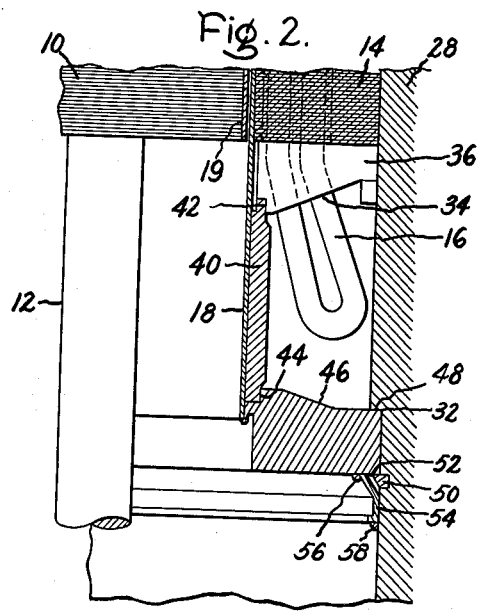

While the specification concludes with a claim particularly pointing out and distinctly claiming the subject matter which I regard as my invention, it is believed the invention will be better understood from the following description taken in connection with the accompanying drawing in which:

FIGURE 1 is a partial view of an end of a motor including a rotor and stator and showing the disposition of the closure ring; and FIGURE 2 is a modification of the ring shown in FIGURE 1.

Referring now to the drawing wherein like reference characters designate like or corresponding parts throughout the several views, there is shown in FIGURE 1, a squirrel cage rotor 10 supported on a shaft 12 arranged for positioning within a stator 14. The stator comprises a plurality of laminations having conductor slots therein for receiving coils having end turns 16. Stainless steel cans 18 and 19 are attached to the peripheral surface of the rotor and in the bore of the stator to form the air gap for the machine. In the usual construction, liquid at approximately 2,000 p.s.i. pressure is circulated in the air gap.

In order to provide a construction capable of withstanding the forces of pressure on the can in the region of the air gap, while simultaneously serving as an effective seal for preventing leakage of liquid into the area containing the end turns, a closure ring 20 is positioned adjacent the bottom end of the motor as shown in FIGURE 1. The ring 20, which preferably comprises a singular casting of material, is in the shape of a heavy trapezoidal member having a small diameter inner tubular member 22 joined with a larger diameter tubular member 24 by a thick section 26. As illustrated, the thin tubular member 24 is welded to the stator casing or frame 28 at 30. The tubular member 22 of smaller diameter, is fitted in abutting relationship with the can 18 and is welded thereto at 31.

As previously mentioned, liquid under pressure of approximately 2,000 p.s.i. is circulated through the air gap thus exerting hydraulic forces on the ring in the direction indicated by the arrows. The heavy ring section 26 is supported by a shoulder 32 in the stator casing and under the action of the hydraulic pressure on the inner radius and lower surface, tends to rotate about the point 32. Since this movement causes the inner radius to move axially upwardly, it is desirable to minimize the rotative effect by suitably choosing the proportions of the ring to keep deformation to a safe minimum. The selection of a ring of trapezoidal cross section effectively provides the necessary support and it is more rigid than a rectangular section of the same weight. The smaller diameter tubular member 22 of the ring is supported in a radial direction by fingers 34 of a stator lamination clamping disc 36 but is free to move axially without loading the stator punchings. The construction which makes possible such radial and axial movement for absorbing the forces created by hydraulic pressure, is more fully disclosed in the patent application of J. A. Walsh and H. C. Ward, Serial No. 779,703, filed December 11, 1958, entitled "Stator Can Support," assigned to the same assignee as the present invention and filed concurrently herewith. This construction comprising the thick central section 26 and the tubular member 22 has sufficient cross section thickness to withstand the hydraulic forces tending to cause outward deformation of member 22. The bending movement which otherwise would occur about point 32 is therefore minimized to the point where its effect is negligible.

With the forces acting on ring 20 in the direction indicated by the arrows, and rotation tends to occur about point 32, a stress is exerted on the seal weld 30 joining the tubular member 24 to the stator casing. It will be noted that the length of member 24 is several times its thickness. Since this section of the ring is supported by the stator casing, the hydraulic pressure does not produce any appreciable stress in the thin area. However, in the event the ring section does deflect in an axial upward direction at the bore, the corner of the ring attached to the thin tubular section tends to lift away from the stator casing. At the same time, the backing of the thin tube is removed at this point so that there is a net increase in force tending to reduce the deflection at the bore. Problems of stress therefore are not present in the thin tubular member and since the bending stresses are low, it is not subjected to large hoop action because of the backing provided by the stator frame or casing 28. As a result, loads of appreciable magnitude are not imposed upon the seal weld.

The advantages resulting from the combined use of the ring as a closure member and can support is that minimum deflection is provided with minimum weight thus permitting the use of a very small seal weld. The area further permits the application of weld material without excessive expenditure of time and effort and without encountering distortion of the parts.

The modification of FIGURE 2 presents a slightly different arrangement wherein the trapezoidal configuration of ring 20 is maintained but the tubular sections are broken into a plurality of parts which when joined provide only a few mils clearance. As illustrated, the can 18 is arranged to extend outwardly a greater distance than in the previous embodiment and is designed to bear against a tubular member 40 positioned in engagement with the stator clamping disc 36 at 42. The other end of member 40 has a shoulder 44 engaging a step provided in a heavy cylindrical ring 46. The outer peripheral portion of ring 46 is likewise fitted into a stepped portion 48 of the stator casing 28. When the parts are assembled in this manner, a retaining ring 50, is fitted into place in the stator casing and is arranged to have a portion of its surface engage the flat portion 52 of ring 46, thus positioning it accurately in the machine. The function served by the retaining ring is to eliminate a tendency of the cylindrical ring 46 from pulling away from point 32 as the weld material contracts upon cooling. An outer tubular member 54 of thin cross section is mounted within the casing 28 and is welded at 56 and 58 to provide a seal effective in preventing ingress of water into the area where the end turns are located.

The constructions described above suggest that the teachings are applicable to other equipment involving a pair of vessels that must provide a seal against high fluid pressures. The invention has been disclosed in connection with dynamoelectric machines, but it will be evident that any apparatus carrying high internal pressures and requiring both a seal for preventing leakage into undesirable areas and structural support for protecting the parts against deformation, may utilize the teachings herein. Many modifications and variations are possible in light of the above disclosure. It therefore is to be understood that within the scope of the appended claim, the invention may be practiced otherwise than as specifically described.

What I claim as new and desire to secure by Letters Patent of the United States is:

A motor comprising a stator core enclosed in a frame and a rotor positioned in the bore of the stator, coils having end turns protruding outwardly from the stator, a cylindrical can on the stator and rotor surfaces forming an air gap therebetween, a clamping ring attached to each end of the stator for supporting the laminations, a first tubular member having its inner surface fixed in fluid-tight relationship with the stator can and including one end in firm engagement with said clamping ring, a cylindrical ring having a shoulder coacting with the other end of said tubular member and positioned between said member and the frame and thereby defining a cavity enclosing the end turns in a dead air space, a groove formed in the inner surface of said stator frame for receiving the outer surface of the cylindrical ring, a retaining member fitted in the internal wall of the stator frame and arranged for contact with the exposed portion of said cylindrical ring for holding the latter in a predetermined position, and a second tubular member having a diameter greater than said first tubular member having its peripheral surface in engagement with the stator frame and an edge thereof in contact with the cylindrical ring, and means sealing said second tubular member with the stator frame, thereby providing a construction capable of withstanding the hydraulic forces imposed on the inner cylindrical surfaces of the can on the stator inner surface while simultaneously preventing leakage of water into the stator portion housing the coils.

References Cited in the file of this patent

UNITED STATES PATENTS

| 2,128,544 | Surjaninoff | Aug. 30, 1938 |
| 2,804,556 | Schanz | Aug. 27, 1957 |
| 2,887,062 | Cametti | May 19, 1959 |

FOREIGN PATENTS

| 196,955 | Austria | Apr. 10, 1958 |
| 803,395 | Great Britain | Oct. 22, 1958 |